(12) United States Patent
Kurozuka et al.

(10) Patent No.: US 6,526,018 B1
(45) Date of Patent: Feb. 25, 2003

(54) DISK CARTRIDGE

(75) Inventors: Akira Kurozuka, Osaka (JP); Eiichi Hanakawa, Kyoto (JP); Hitoshi Minabe, Osaka (JP); Tomio Yamamoto, Hyogo (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 99 days.

(21) Appl. No.: 09/718,738

(22) Filed: Nov. 22, 2000

(30) Foreign Application Priority Data

Dec. 8, 1999 (JP) ............................. 11-348611

(51) Int. Cl.⁷ ............................. G11B 3/70; G11B 5/84; G11B 7/26
(52) U.S. Cl. ..................................... 369/272
(58) Field of Search ................. 369/272, 291; 360/131, 132, 133; D14/474, 478, 479, 480

(56) References Cited

U.S. PATENT DOCUMENTS

| | | | |
|---|---|---|---|
| 4,464,692 A | 8/1984 | Yoshida et al. | 360/133 |
| 4,614,990 A | 9/1986 | Saito | 360/133 |
| 5,636,095 A | 6/1997 | McGrath et al. | 360/133 |
| 5,745,458 A * | 4/1998 | Oliver et al. | 369/53.28 |
| 5,991,130 A * | 11/1999 | Schick et al. | 360/133 |
| D418,828 S * | 1/2000 | Iftikar et al. | D14/120 |
| 6,188,542 B1 * | 2/2001 | Cheong | 360/99.06 |
| 6,226,150 B1 * | 5/2001 | Nguyen | 360/133 |
| 6,388,973 B1 * | 5/2002 | Shimizu et al. | 369/75.2 |
| 2001/0021158 A1 * | 9/2001 | Sanada et al. | 369/77.2 |
| 2002/0006086 A1 * | 1/2002 | Suzuki et al. | 369/30.41 |
| 2002/0060969 A1 * | 5/2002 | Shimazaki et al. | 369/77.2 |

FOREIGN PATENT DOCUMENTS

| | | |
|---|---|---|
| EP | 0 795 856 A2 | 9/1997 |
| EP | 1 001 422 A2 | 5/2000 |
| EP | 1 152 418 A1 | 11/2001 |
| JP | 7-6493 | 1/1995 |
| JP | 2000-195215 | 7/2000 |
| WO | WO 01/37281 A1 | 5/2001 |

* cited by examiner

*Primary Examiner*—Brian E. Miller
*Assistant Examiner*—Julie Anne Watko
(74) *Attorney, Agent, or Firm*—Merchant & Gould, P.C.

(57) ABSTRACT

In a disk cartridge, a round portion with a circular arc shape whose center substantially coincides with that of a disk is formed at the forefront edge of the disk cartridge in the direction of insertion into a disk drive unit, and the remaining portion is a rectangular shape. The round portion preferably is formed so as to be decreased gradually in thickness toward its leading end. On the other hand, part of the components of the disk drive unit is arranged in an open space at corner portions at the forefront of the disk cartridge. A space in the disk drive unit thus can be utilized efficiently, whereby a small, thin disk drive unit having excellent operability and a disk cartridge permitting such a disk drive unit can be obtained.

10 Claims, 15 Drawing Sheets

DISK CARTRIDGE

BACKGROUND OF THE INVENTION

1. Field of the Invention

The present invention relates to a disk cartridge and disk drive unit for recording/reproducing information on/from a disk, using light or magnetism.

2. Description of the Related Art

Optical disk devices have been used widely for driving optical disks used as audio disks, videodisks, and data storage units in computers. In accordance with the improvement in memory density of the disks, demand has been increased for compact optical disk devices capable of recording and/or reproducing information with high density. As well as audio or video (AV) apparatuses, personal computers are getting smaller and more portable and hence, the optical disk devices also are desired to be smaller and thinner.

An optical disk capable of recording generally is accommodated in a disk cartridge to avoid adhesion of dust and fingerprints thereon. In a disk drive unit for recording/reproducing information by loading such a disk cartridge, a shutter is opened to expose part of the disk during the loading of the disk cartridge. In a state where the disk cartridge is located at a predetermined position, the disk is subject to chucking to be rotatably driven. An optical head for recording/reproducing information opposes the disk through an opening opened by the shutter and radiates light via an objective lens.

In the case of a magneto-optical disk, while an optical head radiates light forming a light spot to heat a magnetic recording film of the disk, a magnetic head applies a magnetic field to the magnetic recording film to record information. To reproduce the information, the optical head reads the changes in magnetizing directions on the magnetic recording film.

In a drive unit for such a magneto-optical disk, a magnetic head is supported so as to face the disk from the opposite side of the optical head. A supporting member of the magnetic head is connected to the optical head, and the supporting member and the optical head are integrally fed in the radial direction of the disk to scan an area between the inner periphery and the outer periphery of the disk.

Now, the structure of a conventional disk cartridge and its drive unit will be explained.

FIGS. 9A and 9B are perspective views showing the appearance of a conventional disk cartridge. FIG. 9A shows a state where a shutter 32 is closed, and FIG. 9B shows a state where a shutter 32 is opened to expose a disk 33.

FIG. 10 is an exploded perspective view showing the structure of a conventional disk cartridge.

In FIGS. 9A, 9B, and 10, an upper half 35 and a lower half 36 both having a substantially square shape in plan view are connected to each other to form a disk cartridge 31, which rotatably accommodates the disk 33. Openings 35a and 36a are respectively provided in the upper half 35 and the lower half 36 so that part of the disk 33 is exposed. The opening 36a of the lower half 36 is so largely opened as to extend to the center of the disk 33 in order that a spindle motor for rotatably driving the disk 33 can be inserted thereinto.

When the upper half 35 and the lower half 36 are connected to each other, a shutter lock 34 is incorporated. The shutter lock 34 includes a pivot 34a, a spring 34b, and an engagement portion 34c. The pivot 34a is inserted into holes in the upper half 35 and lower half 36. The spring 34b is in contact with internal walls of concave portions formed in the upper half 35 and lower half 36 so as to limit the rotation of the shutter lock 34. The engagement portion 34c is supported so as to be rotatable over a predetermined angle around the pivot 34a as a center of rotation. The engagement portion 34c is exposed in a side slot 31a formed on a side face, which is on the side where the shutter 32 slides, of the disk cartridge 31. The engagement portion 34c is rotated inwardly to be retracted when an external force is applied from the outside. At this time, the spring 34b is deformed elastically to generate a reaction force. The engagement portion 34c is returned to the initial position when the force is released.

FIG. 11 is a perspective view showing the shape of a shutter. The shutter 32 is formed of a sheet having a cross section of a substantially angular U-shape. The shutter 32 has a sufficient size to cover the openings 35a and 36a of the disk cartridge 31, and is provided with protrusions 32a and 32b, a hook 32c, and a tip hole 32d, which are formed by bending the sheet.

FIG. 12 is a perspective view showing a lower face (the face on the side of the lower half 36) of the conventional disk cartridge. After the upper half 35 and lower half 36 are connected to each other, the shutter 32 is inserted in the direction indicated by the arrow X and the protrusions 32a and 32b are inserted into a guide slot 36b provided in the lower face of the lower half 36, thereby slidably holding the shutter 32 in the direction indicated by the arrow Y. When the shutter 32 slides to a position where the openings 35a and 36a are covered, a hook 32c is engaged with a notch in the engagement portion 34c of the shutter lock 34. A locked condition of the shutter 32 is established so that the shutter 32 is not opened.

The disk cartridge 31 is inserted into the drive unit in the direction indicated by the arrow Y. During insertion, a projection formed in a cartridge holder in the drive unit passes inside the side slot 31a. The projection pushes the engagement portion 34c, which is exposed in the side slot 31a, of the shutter lock 34, thereby releasing the engagement between the engagement portion 34c and the hook 32c of the shutter 32, and limits the movement of the shutter 32 in the insertion direction at the same time. As a result, when the disk cartridge 31 is more deeply inserted, the shutter 32 stays, thereby exposing the openings 35a and 36a On the lower face of the disk cartridge 31, a location hole 36c is formed for maintaining the disk cartridge 31 at a predetermined position in the drive unit.

Next, the structure of a disk drive unit employing the above-mentioned disk cartridge 31 will be explained.

FIG. 13 is a plan view showing the structure of a conventional disk drive unit. Further, FIG. 14 is a side cross-sectional view showing a state where the conventional disk cartridge 31 is being inserted into the conventional disk drive unit.

In FIG. 13, an upper face of a chassis 41 and a cartridge holder 51 are removed so that the internal structure of the disk drive unit can be more easily understood. Further, in FIG. 14, the cartridge holder 51 is shown by the two-dot chain line, and an illustration of the specific structure thereof is omitted.

In FIG. 13, a spindle motor 42 is mounted in the vicinity of the center of the chassis 41. Further, the chassis 41 has two guide shafts 44 and a driving shaft 46, each extending in the direction indicated by the arrow X. A feed motor 45 is connected to one end of the driving shaft 46. An optical head 43 is held by the two guide shafts 44 and spirally interconnected with a screw formed on the outer face of the driving shaft 46. Therefore, the optical head 43 is moved in the direction indicated by the arrow X by rotation of the driving shaft 46.

As shown in FIG. 14, a connecting angle member 47 protrudes from the bottom face of the optical head 43 toward the outside of the side face of the chassis 41 so as to extend above the cartridge holder 51. On the upper end of the connecting angle member 47, a magnetic head arm 48 is mounted so as to be rotatable around a pivot shaft 49 as a center of rotation. The magnetic head arm 48 is a member like a plate spring, and has a magnetic head 50 mounted to its free end. The magnetic head 50 is moved up and down by a magnetic head lifting mechanism (not shown) mounted in the upper part of the cartridge holder 51. During recording, the magnetic head 50 descends to approach a disk surface, and then slides or is floated by air.

A position of the magnetic head 50 is adjusted so as to apply a predetermined magnetic field to the position corresponding to a light spot radiated by the optical head 43. The magnetic head 50 and the optical head 43 are integrally moved by the feed motor 45 in the radial direction between the inner periphery and the outer periphery of the disk.

Further, the cartridge holder 51 is mounted in an upper part of the chassis 41 so as to be rotatable around a pivot shaft 52 as a center of rotation. When one disk is exchanged for another, the cartridge holder 51 together with the magnetic head arm 48 is upwardly sprung up so that the disk cartridge 31 is inserted thereinto. At an entrance of an inserting portion of the cartridge holder 51, there is provided an introduction portion (not shown) that is increased in inner size toward the entrance side. The disk cartridge 31 easily can be inserted with a forefront of the disk cartridge 31 in the insertion direction being in contact with this introduction portion. During insertion, a shutter lock of the disk cartridge 31 is released by the projection (not shown) formed on the inner face of the disk cartridge holder 51 and the shutter 32 is opened.

In the lower part of the chassis 41, there is provided a circuit board 54 having a control circuit for a disk drive unit and a connector for external connection mounted thereon.

FIG. 15 is a side cross-sectional view showing a state where the conventional disk cartridge has been loaded in the conventional disk drive unit.

As shown in FIG. 15, when the cartridge holder 51 having the disk cartridge 31 inserted therein is returned to the initial position, a locating pin 53 is inserted into the location hole 36c (see FIG. 12) so as to fix a position of the disk cartridge 31. At the same time, the leading end of the spindle motor 42 is inserted into a center hole of the disk 33, and a magnet incorporated in the leading end of the spindle motor 42 attracts a clamp plate 33a of the disk 33. The disk 33 is thus loaded in the spindle motor 42.

In this state, the disk 33 is rotatably driven, thereby enabling recording/reproducing of information.

In the above-mentioned structure, the connecting angle member 47 moves along the side face of the chassis 41 while the optical head 43 moves between the inner periphery and the outer periphery of the disk 33. Accordingly, a projected shape of the drive unit as a whole in the normal direction of the disk 33 is a rectangular shape having substantially the same size as that of the smallest rectangle containing the disk cartridge 31. A small recording and reproducing apparatus of a so-called jacket size thus is obtained.

Unfortunately, however, the disk cartridge and the disk drive unit with the above-mentioned structures have the following problems.

As shown in FIG. 15, if the optical head 43 and the feed motor 45 are arranged in a lower part of the disk cartridge 31 to achieve the jacket size, a thickness H1 of a shunting space for a magnetic head 50, a thickness H2 of the disk cartridge 31, and a thickness H3 of a chassis portion determine a thickness H of the drive unit. As the feed motor 45 is arranged in the lower part of the disk cartridge 31, a height (diameter) thereof limits H3 and hence, making the optical head 43 or the spindle motor 42 thinner does not serve to decrease the thickness H of the drive unit. If the feed motor 45 is decreased in height (diameter), the generated torque is reduced, thereby reducing the access speed of the optical head 43. As a result, the disk drive unit is degraded in its performance as a recording and reproducing apparatus.

In order to make the unit thinner, if a flat motor is employed as the feed motor 45 and set in such a manner that a pivot shaft of the motor is perpendicular to a disk surface, it is required to use a gear between the feed motor 45 and the driving shaft 46. Accordingly, as compared with the case where a shaft of the feed motor 45 is directly connected to the driving shaft 46, a feeding accuracy of the optical head is degraded due to a backlash of the gear and a mechanical loss.

If the chassis portion is made thinner by arranging the feed motor 45 so as to be overlapped with the disk cartridge 31 in the horizontal direction (that is to say, arranging the feed motor 45 so as substantially to coincide in height with the disk cartridge 31), a projected area (This refers to a projected area when projected in the normal direction of the disk. The same meaning applies throughout.) of the drive unit is largely expanded as compared with that of the disk cartridge 31, whereby the so-called jacket size cannot be attained.

In the case where the circuit board 54 is mounted in a lower part of the chassis 41 as shown in FIGS. 13 to 15, if the feed motor 45 downwardly protrudes, a notch has to be made on the circuit board 54 to prevent the interference with the feed motor 45. This results in a decreased area of the circuit.

These problems are particularly serious in minimizing a projected area as well as a thickness of a small-type drive unit, particularly for a disk with a small diameter loaded in portable equipment.

Further, as a unit is made thinner, it becomes more difficult to provide an introduction portion that is enlarged in size as compared with the disk cartridge 31 at an entrance of an inserting portion of the cartridge holder 51. Accordingly, insertion of the disk cartridge is made difficult, resulting in considerably degraded operability of the drive unit.

SUMMARY OF THE INVENTION

Therefore, with the foregoing in mind, it is a first object of the present invention to provide a smaller and thinner disk drive unit, and a disk cartridge for realizing such a disk drive unit. Further, it is a second object of the present invention to provide a disk drive unit whose operability is not degraded even if made small and thin, and a disk cartridge for realizing such a disk drive unit.

In order to attain the above-mentioned objects, the present invention has the following structure.

The first disk cartridge according to the present invention includes a case for rotatably accommodating a disk for recording and/or reproducing information, an opening, which is provided in the case, for exposing part of the disk, and a shutter for closing the opening. The first disk cartridge is characterized in that a planar shape of the case includes a portion that is substantially rectangular except for a forefront edge in a direction of insertion into the drive unit and a protruding round portion formed on the forefront edge in the direction of insertion into a drive unit, at least part of an outer periphery of the round portion being formed in a circular arc shape whose center substantially coincides with the center of rotation of the disk to be accommodated, and the shutter slides along with one edge that is parallel to the direction of insertion into a drive unit.

In the above-mentioned first disk cartridge according to the present invention, the protruding round portion having a circular arc portion, which is formed along the outer periphery of the disk, is formed on the forefront edge of the substantially rectangular portion in the direction of insertion into a drive unit. In other words, both corner portions on the forefront edge in the insertion direction of a conventional substantially square disk cartridge are removed. Therefore, the area corresponding to the corner portions becomes vacant when the disk cartridge is loaded in the disk drive unit, and components of the drive unit thus efficiently can be arranged therein. As a result, a thickness of the drive unit of a so-called jacket size can be decreased.

Further, this disk cartridge greatly differs from a conventional substantially square disk cartridge in appearance. Therefore, disks to be accommodated in these disk cartridges easily can be distinguished from each other.

In the above-mentioned first disk cartridge, it is preferable that the leading end of the round portion in the insertion direction into a drive unit is made thinner than the substantially rectangular portion of the case. In this preferable structure, the round portion whose leading end is thus made thinner yields an open space in upper and lower parts thereof and enables an arrangement of components of the drive unit in the open space. Accordingly, a thickness of the drive unit can be further decreased.

The second disk cartridge according to the present invention includes a case for rotatably accommodating a disk for recording and/or reproducing information, an opening, which is provided in the case, for exposing part of the disk, and a shutter for closing the opening. The second disk cartridge is characterized in that a planar shape of the case includes a substantially rectangular portion and a protruding round portion formed on a forefront edge in a direction of insertion into a drive unit, a leading end of the round portion in the direction of insertion into a drive unit is thinner than the substantially rectangular portion, and the shutter slides along with one edge that is parallel to the direction of insertion into a drive unit.

In the above-mentioned second disk cartridge according to the present invention, the protruding round portion is formed at the forefront edge of the substantially rectangular portion in the direction of insertion into the drive unit. In other words, both corner portions on the forefront edge in the insertion direction of a conventional substantially square disk cartridge are removed. Therefore, the area corresponding to the corner portions becomes vacant when the disk cartridge is loaded in the disk drive unit, and components of the drive unit thus can be efficiently arranged therein. Further, the round portion whose leading end is made thinner yields an open space in upper and lower parts thereof and enables an arrangement of components of the drive unit in the open space. As a result, a thickness of the drive unit of a so-called jacket size can be decreased.

Further, this disk cartridge greatly differs from a conventional substantially square disk cartridge in appearance. Therefore, disks to be accommodated in these disk cartridges easily can be distinguished from each other.

In each of the above-mentioned first and second disk cartridges, it is preferable that the round portion is formed so as to be gradually decreased in thickness toward the leading end. According to this preferable structure, the function of an introduction portion, which is conventionally mounted in the cartridge holder of the drive unit, is given to the round portion of the disk cartridge. Therefore, reduced-sizing or removal of an introduction portion at the entrance of the inserting portion of the cartridge holder is made possible without degrading the operability of the disk cartridge during insertion. As a result, a thickness of the drive unit can be decreased further.

Further, in each of the above-mentioned first and second disk cartridges, it is preferable that the outer periphery of the round portion has an inflection point on a side of a shutter sliding edge with respect to the leading end of the round portion and no inflection point on a side of an edge opposite to the shutter sliding edge with respect to the leading end of the round portion. That is, on the side of the shutter sliding edge, an opening, a sliding distance of the shutter, and a space for mounting a mechanism for maintaining the closing state of the shutter can be secured by gently curving the outer periphery of the round portion via the inflection point along the forefront edge of the substantially rectangular portion in the insertion direction. On the other hand, on the side of the edge opposite to the shutter sliding edge, the removed portion (notch portion) at the corner portion on the side of the opposite edge can be made large by curving the outer periphery of the round portion without an inflection point (preferably gently along the opposite edge). This serves to enlarge an open space. By arranging more components of the drive unit in the above-mentioned open space, it becomes possible further to decrease a thickness of the drive unit.

It is preferable that the above-mentioned first and second disk cartridges further are provided with a closing-state maintaining mechanism for maintaining a state where the opening is closed by the shutter. This mechanism prevents the opening from being accidentally opened, and thus avoids scratches on the accommodated disk as well as dirt and fingerprints adhesion onto the disk.

The above-mentioned first and second disk cartridge can be used with a magneto-optical disk or an optical disk accommodated therein.

A disk drive unit according to the present invention includes a head for recording and/or reproducing information with respect to a disk accommodated in a disk cartridge, a spindle motor for rotatably driving the disk, a feed motor for feed-driving the head in a radial direction of the disk, and a loading member for loading the disk cartridge, the disk drive unit having a projected shape that is a rectangle substantially coincident with a smallest rectangle containing the disk cartridge. The disk drive unit is characterized in that part of its components is arranged in at least one corner portion of the smallest rectangle containing the disk cartridge loaded in the loading member so as substantially to coincide in height with the loaded disk cartridge. What is meant by "the smallest rectangle containing the disk cartridge" is the rectangle of the smallest size among those capable of containing the planar shape of the disk cartridge. Further, "projected shape" means a shape projected in the normal direction of the disk surface.

In this structure, part of the components conventionally arranged over or under the disk cartridge loaded in the loading member to avoid the interference with the disk cartridge effectively can be arranged in corner portions of the smallest rectangle containing the loaded disk cartridge so as substantially to coincide in height with the loaded disk cartridge. Accordingly, a thickness of a chassis portion of the drive unit can be made thinner without increasing a projected area of the drive unit. As a result, a thin drive unit of a so-called jacket size can be obtained. Further, if the drive unit maintains the same thickness, it is possible to improve an access speed of the disk drive unit by the use of a feed motor having a larger diameter, for example.

Further, when a conventional disk cartridge of a substantially square shape is erroneously inserted into the drive unit, part of the components of the drive unit bumps against the forefront of the disk cartridge in the insertion direction, thereby preventing the disk cartridge from being loaded. Accordingly, damage to the drive unit or a disk and erroneous operation due to the insertion of disk cartridges of other standards having no compatibility with the drive unit is prevented beforehand.

In the above-mentioned disk drive unit according to the present invention, an optical head may be employed as the above-mentioned head, whereby a drive unit for a magneto-optical disk or an optical disk can be provided.

These and other advantages of the present invention will become apparent to those skilled in the art upon reading and understanding the following detailed description with reference to the accompanying figures.

BRIEF DESCRIPTION OF THE DRAWINGS

FIG. 1A shows a state where a shutter is closed, and FIG. 1B shows a state where the shutter is opened.

FIG. 9A shows a state where the shutter is closed, and FIG. 9B shows a state where the shutter is opened.

DESCRIPTION OF THE PREFERRED EMBODIMENTS

Figure 1A:
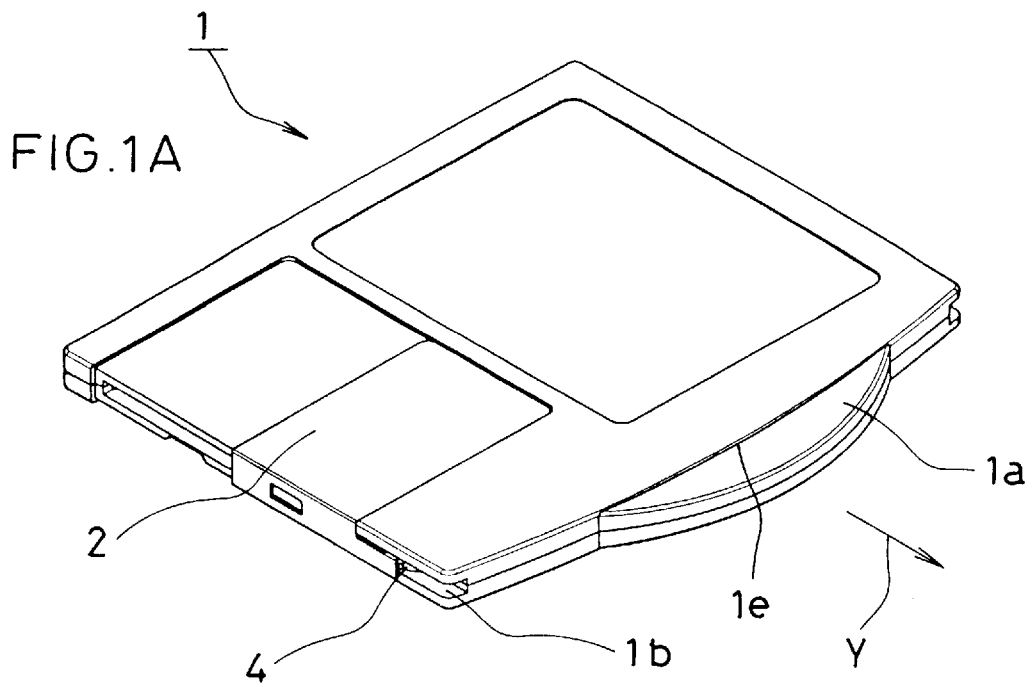
FIGS. 1A and 1B are perspective views showing the appearance of a disk cartridge according to the present invention.
Figure 1B:
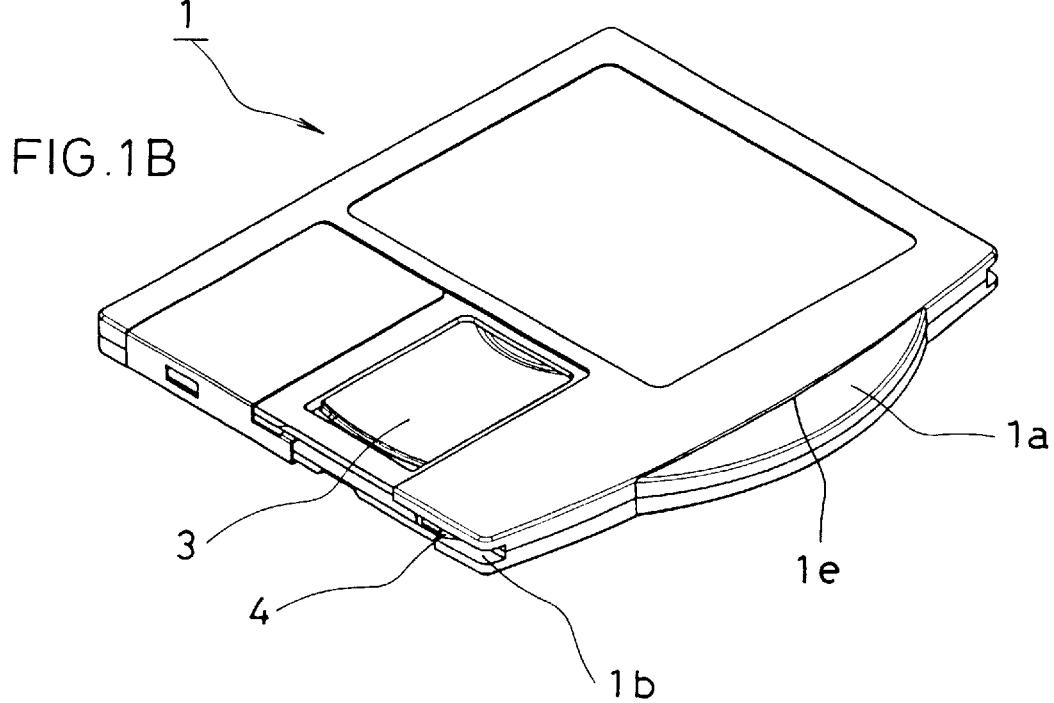

FIGS. 1A and 1B are perspective views showing the appearance of a disk cartridge according to the present invention. FIG. 1A shows a state where a shutter 2 is closed, and FIG. 1B shows a state where the shutter 2 is opened to expose a disk 3.

Figure 2:
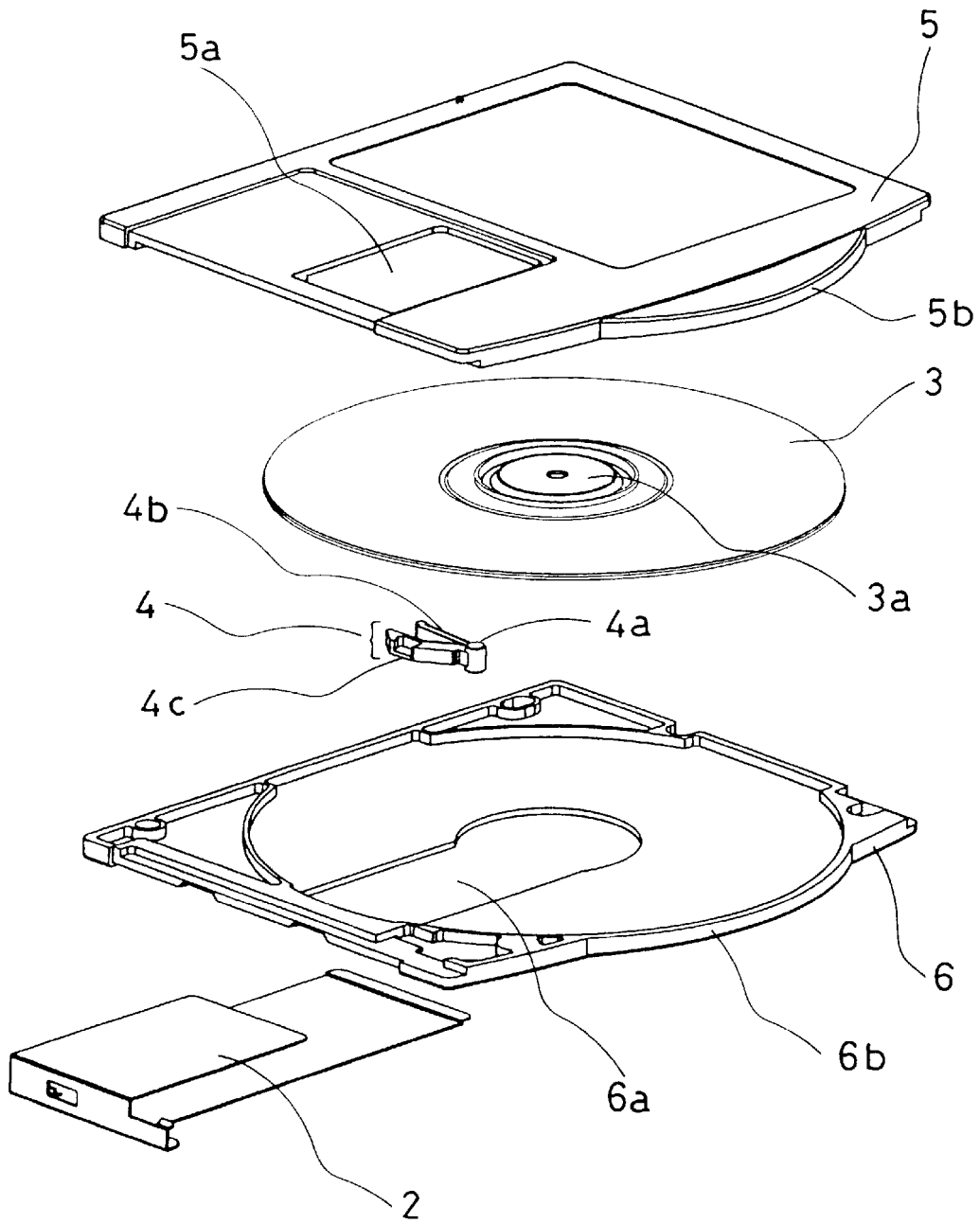
FIG. 2 is an exploded perspective view showing the structure of a disk cartridge according to the present invention.

FIG. 2 is an exploded perspective view showing the structure of a disk cartridge according to the present invention.

In FIG. 1 and FIG. 2, a disk cartridge 1 rotatably accommodates the disk 3 in a case having an upper half 5 and a lower half 6 connected to each other. In the upper half 5 and the lower half 6, protruding round portions 5b and 6b having substantially circular arc shapes are formed on one edge of bodies having a substantially rectangular shape. The round portions 5b and 6b are formed on part of a forefront edge 1e in the direction of insertion into a drive unit, which is indicated by the arrow Y. Centers of the circular arcs of the round portions 5b and 6b substantially coincide with that of the disk 3 contained in the disk cartridge. Further, the radii of the circular arcs of the round portions 5b and 6b can be set to be as small as possible as long as they are large enough to provide sufficient space for rotating the accommodated disk 3. When the upper half 5 and the lower half 6 are connected to each other, the round portions 5b and 6b automatically are connected to each other to form a round portion 1a of the disk cartridge 1.

The upper half 5 and the lower half 6 are provided with openings 5a and 6a so as to expose part of the disk 3. The opening 6a of the lower half 6 is opened so as to extend to the center of the disk 3 in order that a spindle motor for rotatably driving the disk 3 can be inserted thereinto.

When the upper half 5 and the lower half 6 are connected to each other, a shutter lock 4 is incorporated. The shutter lock 4 is mounted in a corner portion defined by the edge along which the shutter 2 of the disk cartridge 1 slides and the edge 1e on which the round portion 1a is formed. The shutter lock 4 includes a pivot 4a, a spring 4b, and an engagement portion 4c, as in the case of the conventional cartridge. The pivot 4a is inserted into holes in the upper half 5 and lower half 6. The spring 4b is in contact with internal walls of concave portions formed in the upper half 5 and lower half 6 so as to limit the rotation of the shutter lock 4. The engagement portion 4c is supported so as to be rotatable over a predetermined angle around the pivot 4a as a center of rotation. The engagement portion 4c is exposed in a side slot 1b formed on a side face, which is on the side where the shutter 2 slides, of the disk cartridge 1. The engagement portion 4c is rotated inwardly to be retracted when an external force is applied from the outside. At this time, the spring 4b is deformed elastically to generate a reaction force. The engagement portion 4c is returned to the initial position when the force is released.

The shutter 2 can have the same shape as that of the shutter 32 of the conventional disk cartridge shown in FIG.

11. The shutter 2 is formed of a sheet having a cross section of a substantially angular U-shape, and mounted in the disk cartridge 1 in the same manner as that in the conventional disk cartridge.

Figure 11:
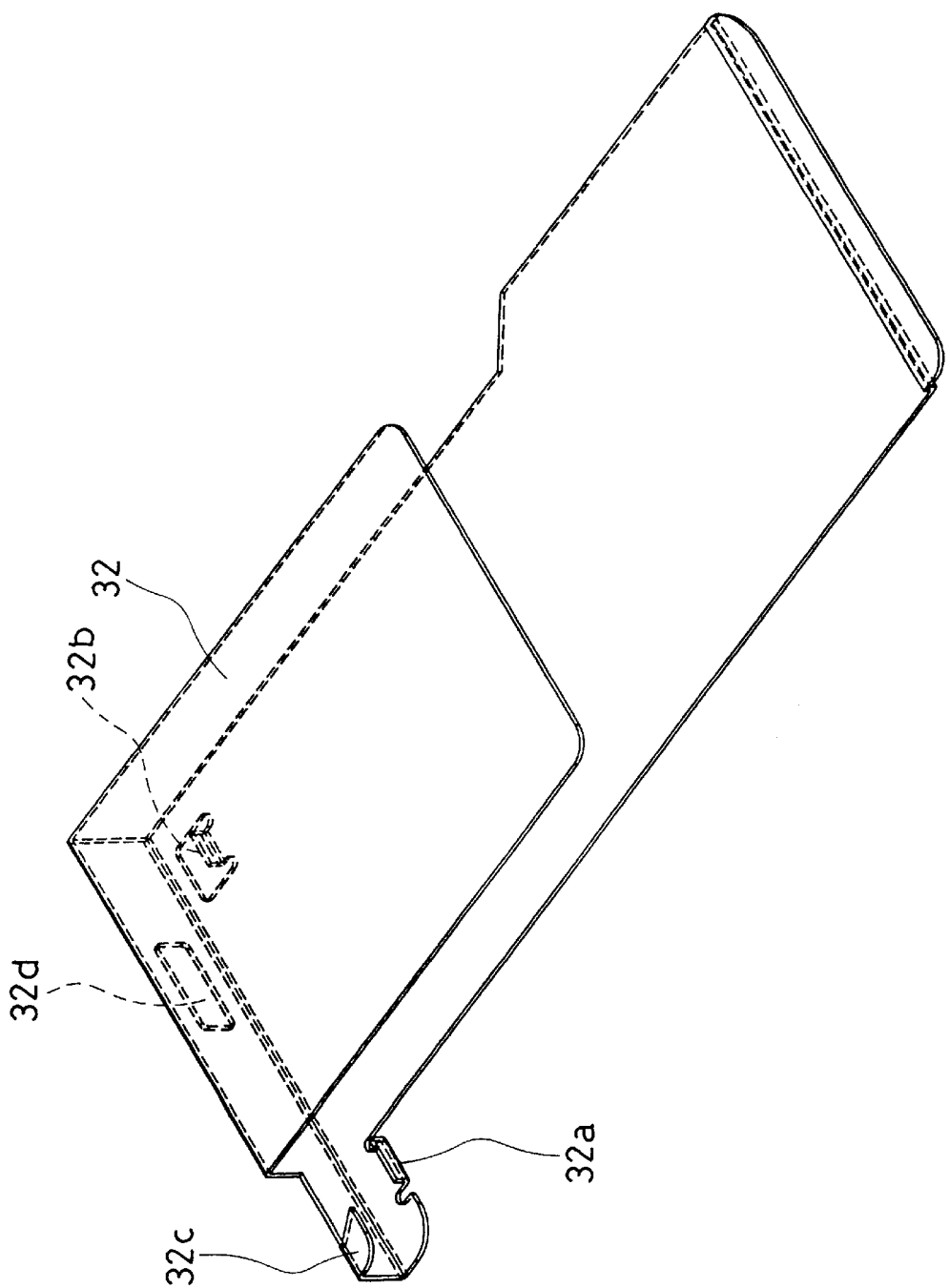
FIG. 11 is a perspective view showing the shape of a shutter.
Figure 12:
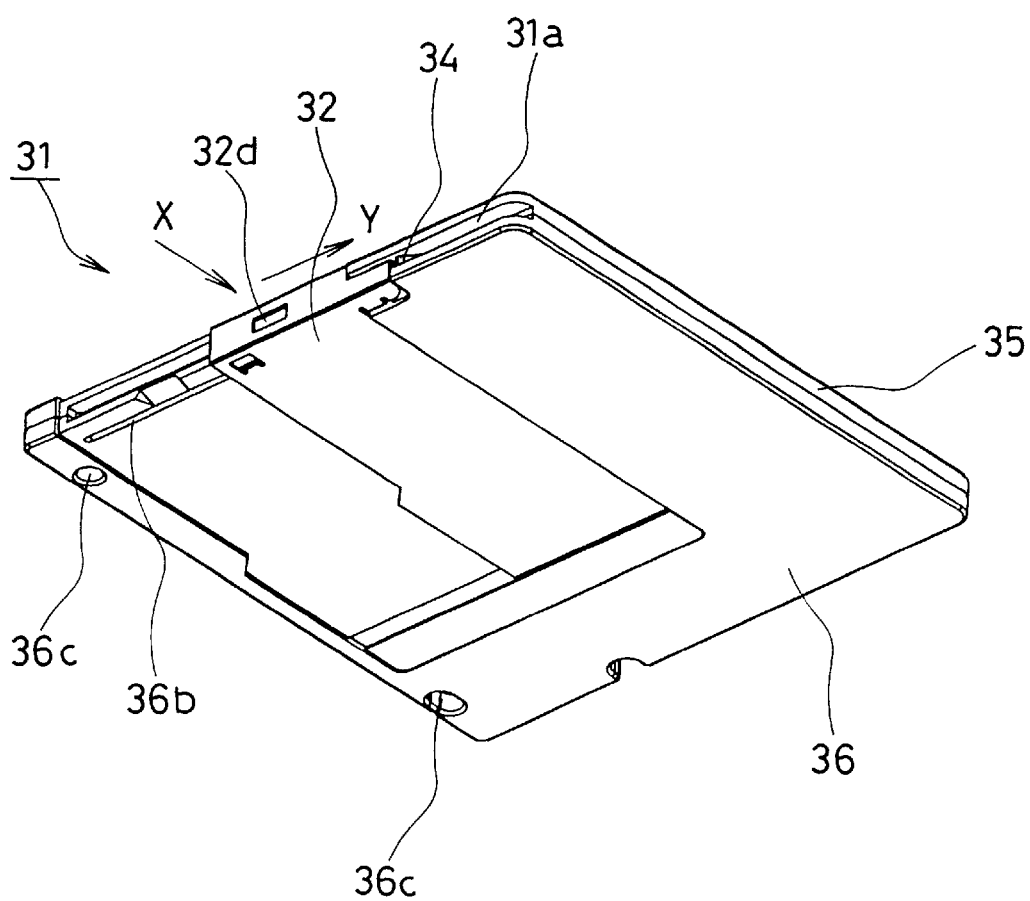
FIG. 12 is a perspective view showing the bottom face of a conventional disk cartridge.
Figure 13:
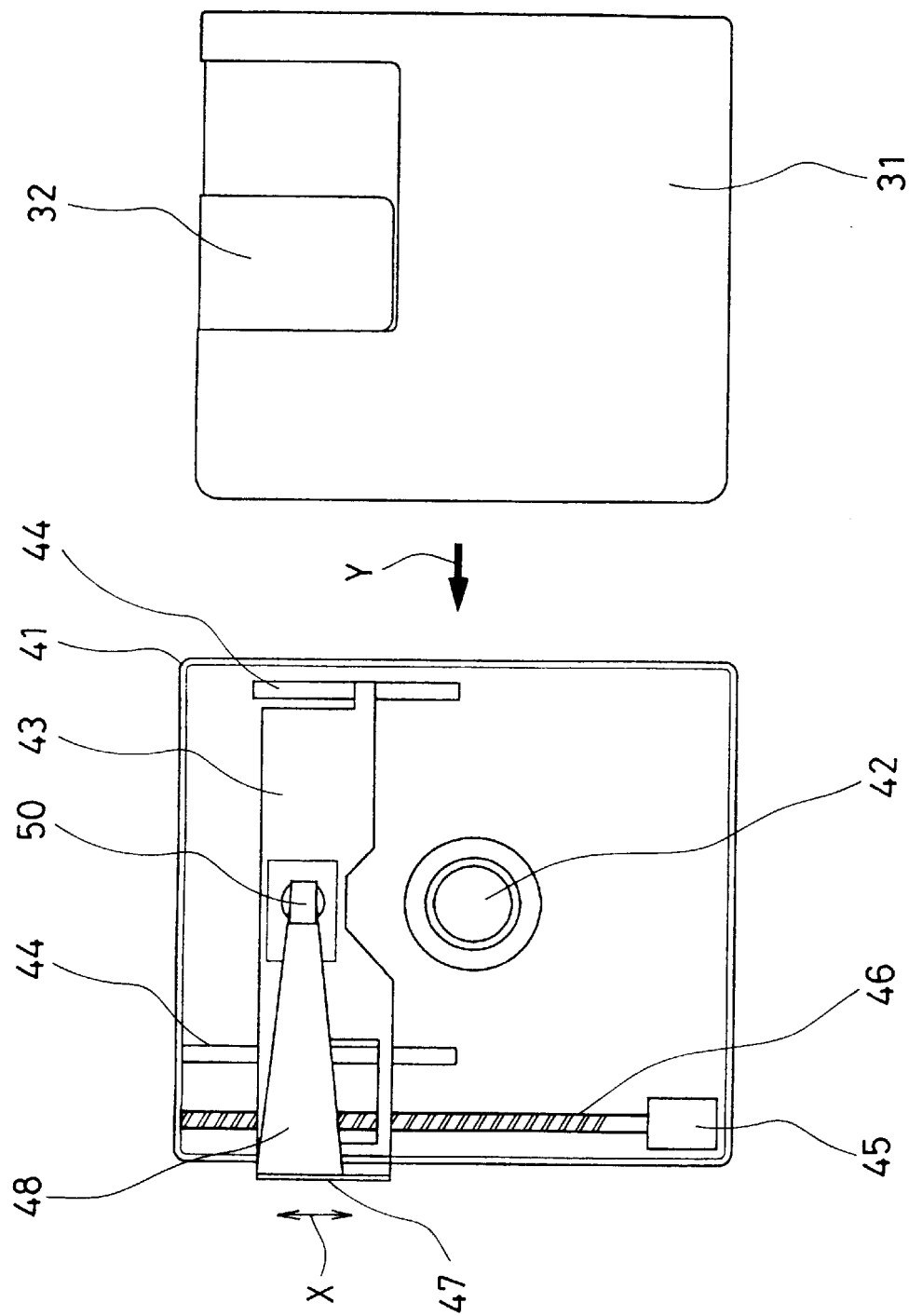
FIG. 13 is a plan view showing the structure of a conventional disk drive unit.
Figure 14:
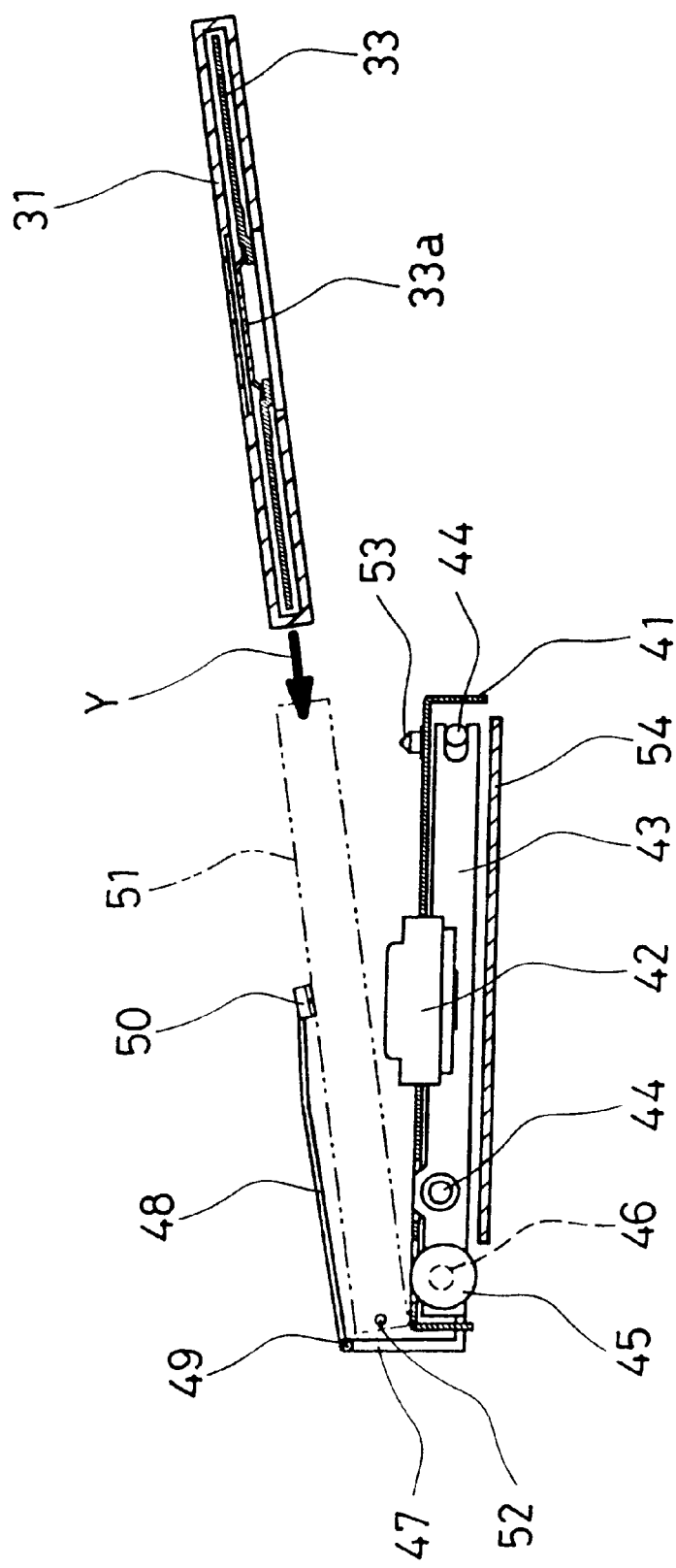
FIG. 14 is a side cross-sectional view showing a state where a conventional disk cartridge is being inserted into a conventional disk drive unit.
Figure 15:
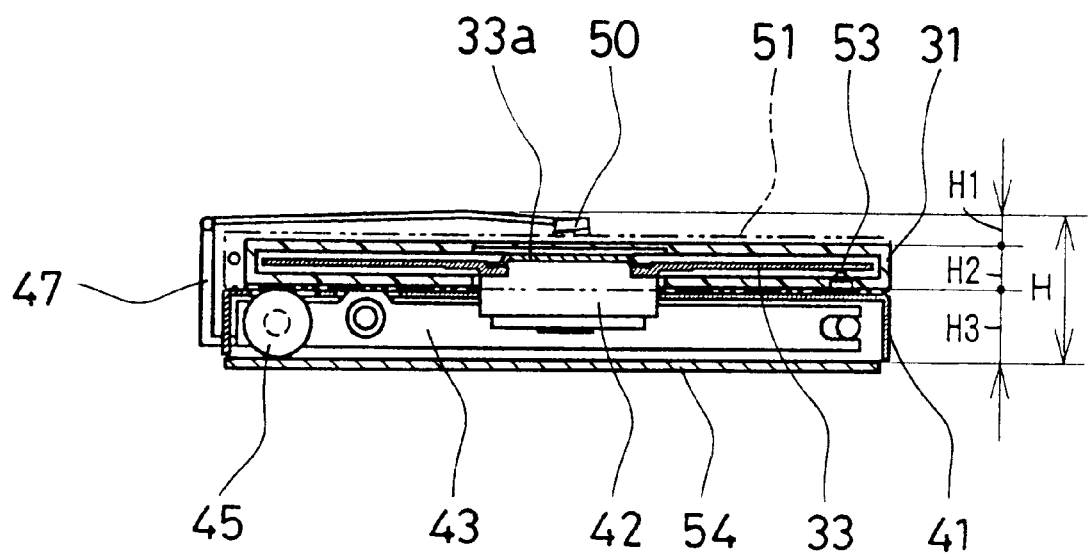
FIG. 15 is a side cross-sectional view showing a state where a conventional disk cartridge has been loaded in a conventional disk drive unit.

The disk cartridge 1 is inserted into the drive unit in the direction indicated by the arrow Y in FIG. 1A. As in the case of the conventional disk cartridge, a projection formed in a cartridge holder in the drive unit passes inside the side slot 1b during insertion. The projection pushes the engagement portion 4c, which is exposed in the side slot 1b, of the shutter lock 4, thereby releasing the engagement between the engagement portion 4c and a hook (the hook 32c shown in FIG. 11) of the shutter 2 and limits the movement of the shutter 2 in the insertion direction at the same time. As a result, when the disk cartridge 1 is more deeply inserted, the shutter 2 stays, thereby exposing the openings 5a and 6a.

Figure 3:
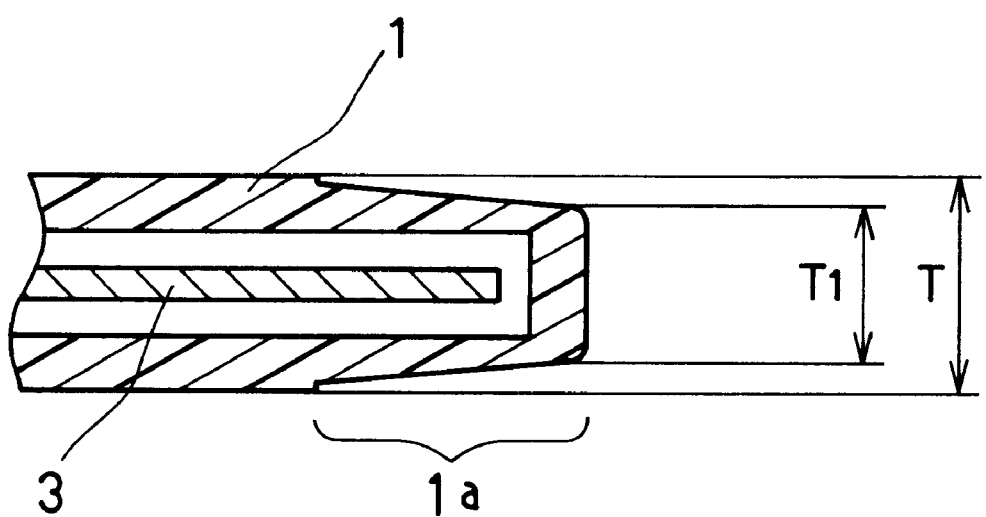
FIG. 3 is an enlarged cross-sectional view showing the shape of a round portion of a disk cartridge according to the present invention.

FIG. 3 is an enlarged cross-sectional view showing a cross-section (that is parallel to the insertion direction indicated by the arrow Y and through a center of rotation of the disk) of a shape (in the thickness direction) of the round portion 1a formed on the forefront edge in the direction of insertion into a drive unit of a disk cartridge according to the present invention.

As shown in FIG. 3, the thickness T1 of the leading end of the round portion 1a is made thinner than the thickness T of the substantially rectangular portion of the disk cartridge 1. Further, the round portion 1a is formed inclined so as to be gradually decreased in thickness toward its leading end.

Figure 4:
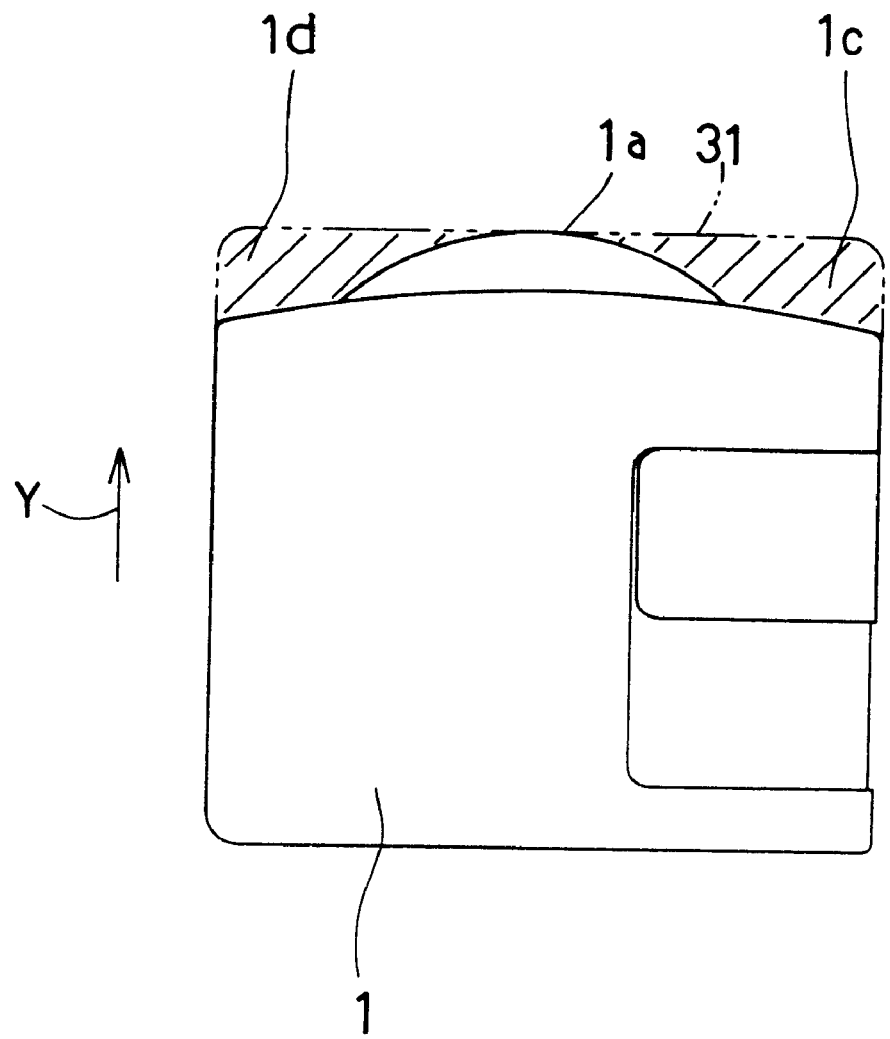
FIG. 4 is a plan view showing the shape of a disk cartridge according to the present invention in comparison with that of a conventional disk cartridge.

FIG. 4 is a plan view showing the shape of the disk cartridge according to the present invention in comparison with that of the conventional disk cartridge.

In FIG. 4, while the conventional disk cartridge 31 shown by the two-dot chain line has a substantially square shape, the disk cartridge 1 of the present invention shown by the solid line has a shape in which corner (notch) portions 1c and 1d, which are shown as the hatched areas, positioned at both the sides of the forefront edge in the insertion direction indicated by the arrow Y largely are removed along the outer peripheral edge of the accommodated disk.

Next, the structure of a disk drive unit of the present invention using the above-mentioned disk cartridge 1 will be explained.

Figure 5:
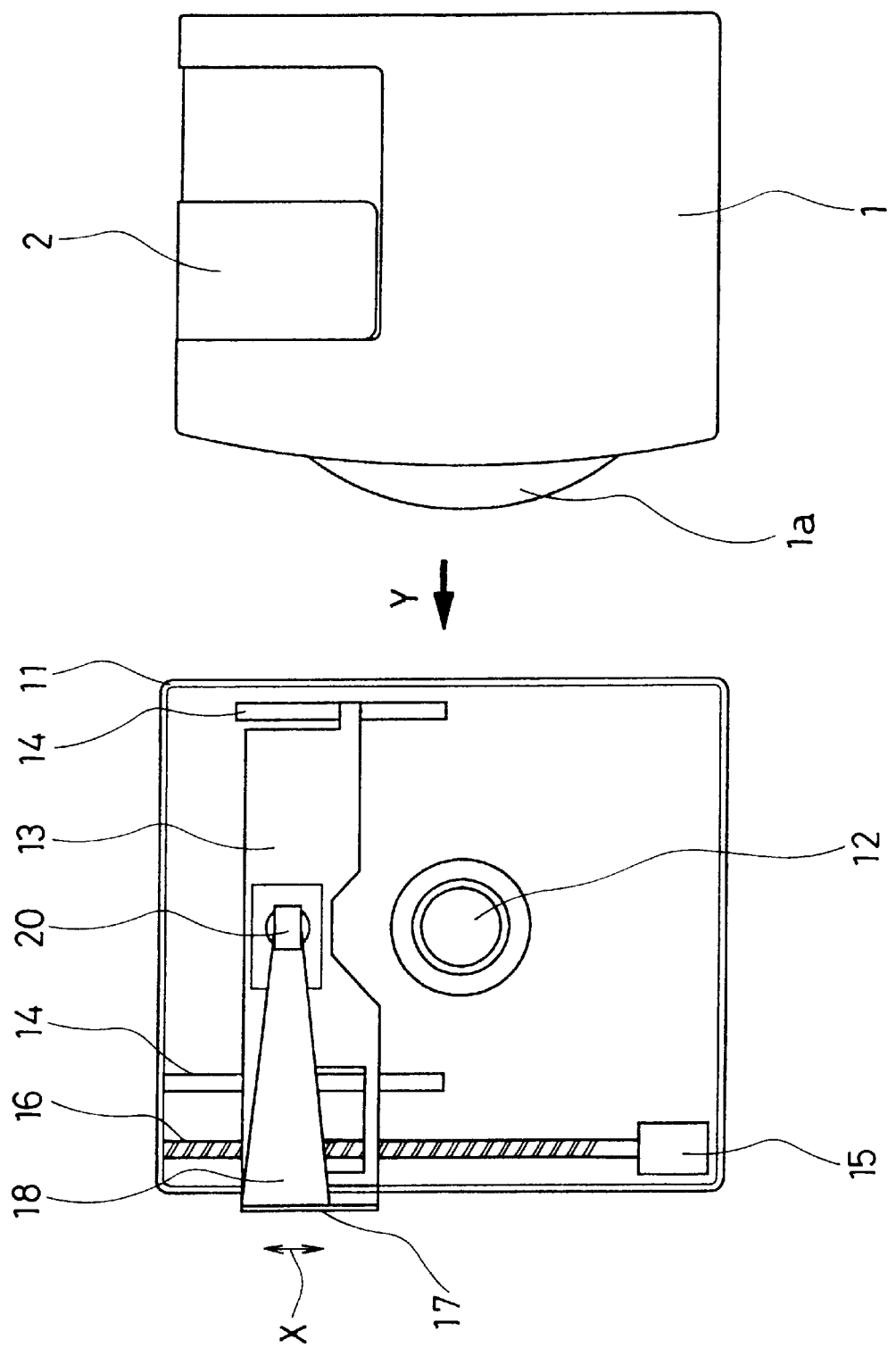
FIG. 5 is a plan view showing the structure of a disk drive unit according to the present invention.

FIG. 5 is a plan view showing the structure of a disk drive unit according to the present invention. Further, FIG. 6 is a side cross-sectional view showing a state where the disk cartridge 1 is being inserted into the disk drive unit according to the present invention.

In FIG. 5, an upper face of a chassis 11 and a cartridge holder 21 are removed so that the internal structure of the disk drive unit more easily can be understood. Further, in FIG. 6, the cartridge holder 21 is shown by the two-dot chain line, and an illustration of the specific structure thereof is omitted.

In FIG. 5, a spindle motor 12 is mounted in the vicinity of the center of the chassis 11. Further, the chassis 11 has two guide shafts 14 and a driving shaft 16, each extruding in the direction indicated by the arrow X. A feed motor 15 is connected to one end of the driving shaft 16. An optical head is held by the two guide shafts 14 and spirally interconnected with a screw formed on the outer surface of the driving shaft 16. Therefore, the optical head 13 is thus moved in the direction indicated by the arrow X by rotation of the driving shaft 16.

Figure 6:
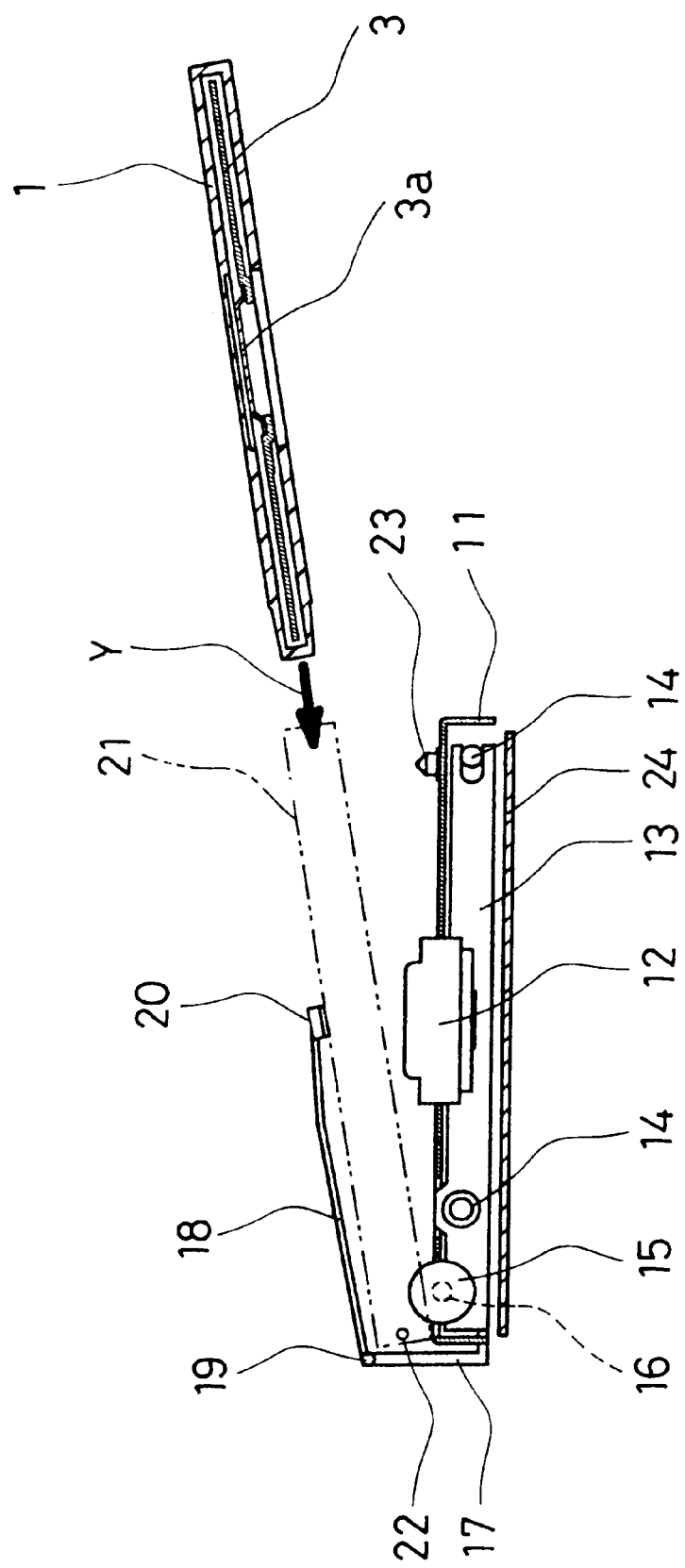
FIG. 6 is a side cross-sectional view showing a state where a disk cartridge according to the present invention is being inserted into a disk drive unit according to the present invention.

As shown in FIG. 6, the feed motor 15 is provided so that it partially protrudes from the upper face of the chassis 11.

A connecting angle member 17 protrudes from the bottom face of the optical head 13 toward the outside of the side face of the chassis 11 so as to extend above the cartridge holder 21. On the upper end of the connecting angle member 17, a magnetic head arm 18 is mounted so as to be rotatable around a pivot shaft 19 as a center of rotation. The magnetic head arm 18 is a member like a plate spring, and has a magnetic head 20 mounted at its free end. The magnetic head 20 is moved up and down by a magnetic head lifting mechanism (not shown) mounted in the upper part of the cartridge holder 21. During recording, the magnetic head 20 descends to approach a disk surface, and then slides or is floated by air.

A position of the magnetic head 20 is adjusted so as to apply a predetermined magnetic field to the position corresponding to a light spot radiated by the optical head 13. The magnetic head 20 integrated with the optical head 13 is moved by the feed motor 15 in the radial direction between the inner periphery and the outer periphery of the disk.

Further, the cartridge holder 21 is mounted in an upper part of the chassis 11 so as to be rotatable around the pivot shaft 22 as a center of rotation. When one disk is exchanged for another, the cartridge holder 21 along with the magnetic head arm 18 is sprung up so that the disk cartridge 1 is inserted thereinto. During insertion, the shutter lock of the disk cartridge 1 is released by the projection (not shown) formed on the inner face of the cartridge holder 21 to open the shutter 2.

At this moment, in the cartridge holder 21, the feed motor 15 protrudes over the path of the disk cartridge 1. However, as shown in FIG. 4, at the forefront in the insertion direction, both the corner portions 1c and 1d other than the round portion 1a are removed to provide an open space. Therefore, the disk cartridge 1 can be inserted deeply without an interference of the feed motor 15 with the disk cartridge 1.

Further, as shown in FIG. 3, the round portion 1a is formed so as to be decreased in thickness toward its leading end and hence, the disk cartridge 1 easily can be inserted into the cartridge holder 21 without an introduction portion that is enlarged in size at the entrance of the inserting portion. This serves to make the cartridge holder 21 thinner.

Figure 7A:
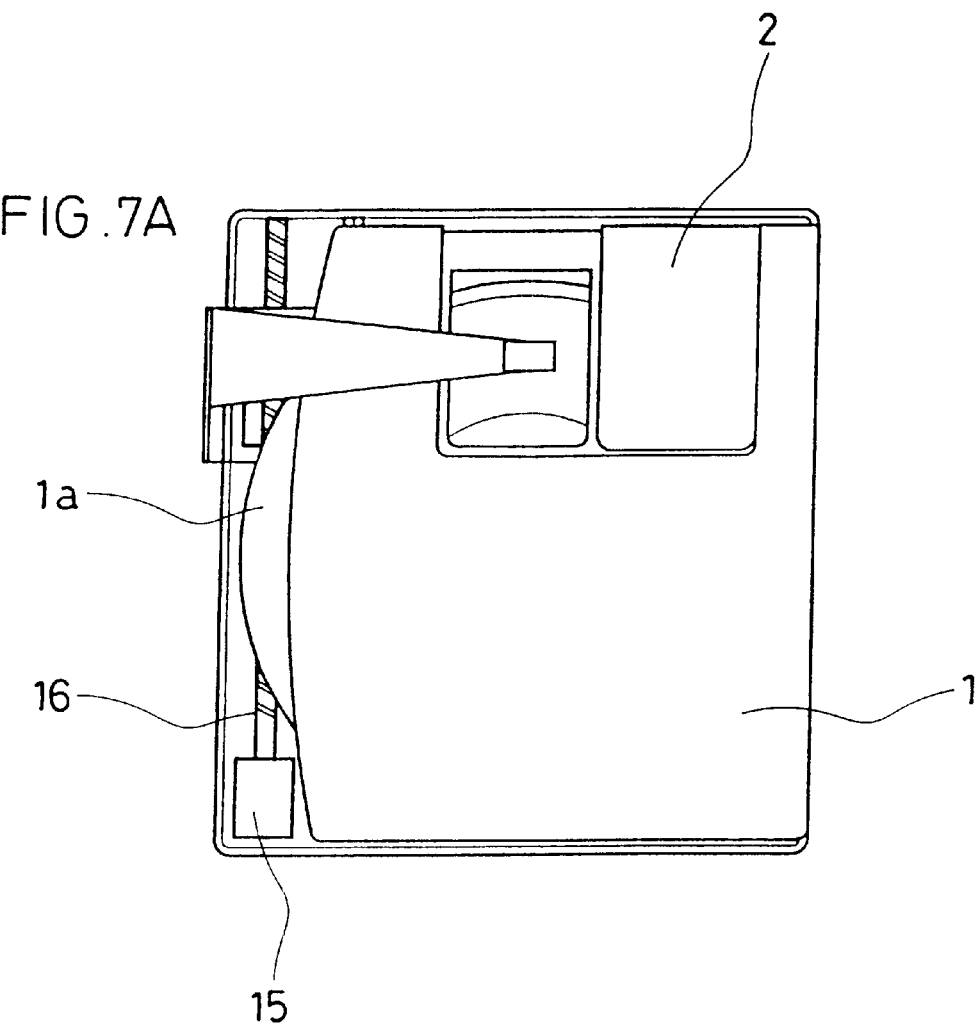
FIG. 7A is a plan view showing a state where a disk cartridge according to the present invention has been loaded in a disk drive unit according to the present invention.
Figure 7B:
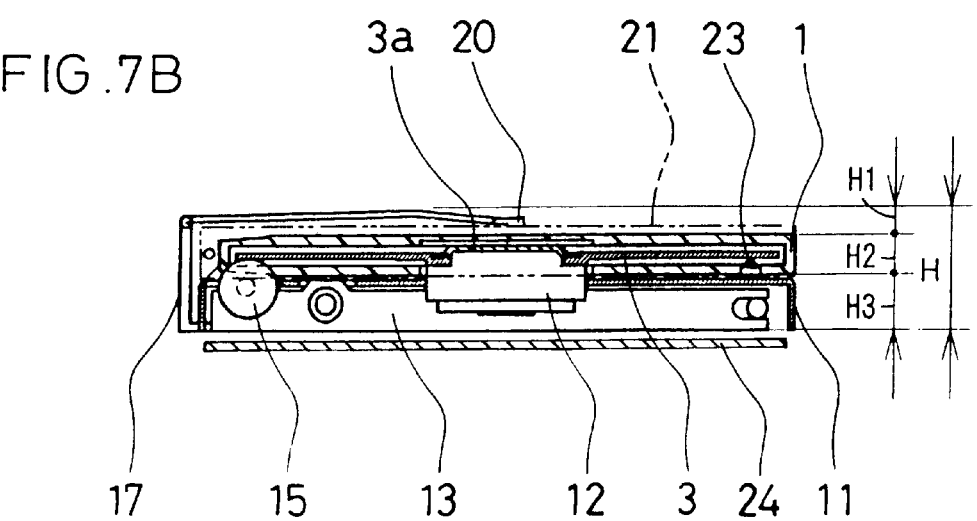
FIG. 7B is a cross-sectional view thereof in the thickness direction.

FIGS. 7A and 7B illustrate a state where the disk cartridge 1 has been loaded in the disk drive unit according to the present invention. FIG. 7A is a plan view and FIG. 7B is a cross-sectional view. In FIGS. 7A and 7B, an upper face of the chassis 11 and the cartridge holder 21 also are removed so that the internal structure of the disk drive unit more easily can be understood.

As shown in FIGS. 7A and 7B, when the cartridge holder 21 is returned to the initial position with the disk cartridge 1 being inserted therein, a locating pin 23 is inserted into a location hole (not shown) formed in the lower face of the disk cartridge 1 so as to fix a position of the disk cartridge 1. At the same time, the leading end of a spindle motor 12 is inserted into a center hole of the disk 3, and a magnet incorporated in the leading end of the spindle motor 12 attracts a clamp plate 3a of the disk 3. The disk 3 thus is loaded in the spindle motor 12.

In this state, the disk 3 is rotatably driven, thereby enabling recording/reproducing of information.

As illustrated, if the chassis 11 is made thin and part of an upper end of the feed motor 15 is arranged so as substantially to coincide in height with the disk cartridge 1, the feed motor 15 does not interfere with the disk cartridge 1 because the feed motor 15 protruding from the upper face of the chassis 11 is accommodated in the open space (i.e., the notch portion 1d shown in FIG. 4) at the forefront of the disk cartridge 1 in the insertion direction.

The driving shaft 16 is located under the round portion 1a of the disk cartridge 1. However, the round portion 1a formed thin does not interfere with the driving shaft 16. This allows the driving shaft 16 to be located upward, thereby enabling the feed motor 15 to be located more upward.

As shown in FIG. 7B, even when the feed motor 15 having the same diameter as that of a conventional feed motor is used, as the feed motor 15 can be located more upward, the thickness H3 of the chassis 11 is not limited by the feed motor 15 and can be made thinner according to a thickness of the spindle motor 12 and the optical head 13. As a result, it becomes possible to decrease the thickness H as a whole. Also, it becomes possible to make a projected area of the disk drive unit substantially coincide with that of the smallest rectangle containing the disk cartridge 1. This leads to the realization of a so-called jacket size.

Further, as the feed motor 15 can be located upward, it is possible to use a feed motor with a larger diameter and hence, an access speed of the optical head 13 can be improved.

In the case where a circuit board 24 is mounted in the bottom part of the chassis 11 as shown in FIGS. 7A and 7B, there is no need to make a notch in the circuit board 24 as the feed motor does not protrude downward. A large package area for the circuit thus can be attained.

Further, as an introduction portion at the entrance of the inserting portion can be made small as described above, the cartridge holder 21 can be made thin, whereby the thickness H as a whole can be made even thinner.

As described above, in the present invention, the connecting angle member 17 moves along the side face of the chassis 11 while the optical head moves between the inner periphery and the outer periphery of the disk 3. Accordingly, a projected shape of the drive unit as a whole is a rectangular shape having substantially the same size as that of the smallest rectangle containing the disk cartridge 1. This serves to realize a thinner disk drive unit while maintaining a conventional jacket size.

It is to be noted that, although the above-mentioned embodiment is directed to a structure in which the drive unit is made thinner by arranging the feed motor 15 in the notch portion 1d of the disk cartridge 1 at the forefront in the insertion direction, the present invention is not limited to this structure. For example, it is also possible to arrange, in the notch portion 1c and/or the notch portion 1d, mechanical parts such as a motor and a gear for moving a magnetic head up and down and relatively large electrical components such as a capacitor and a connector. These parts and components are also difficult to incorporate within the thickness of the chassis 11 as the disk drive unit becomes thinner.

In the disk cartridge 1 according to the above-mentioned embodiment, the shutter 2 is locked by the shutter lock 4 with the openings 5a and 6a being closed. However, a mechanism for maintaining the closed state of the openings 5a and 6a is not limited to this structure. For example, in place of or along with the above-mentioned lock mechanism, an elastic member (specifically, a spring member such as a torsion spring, an extension (or a compression) spring, or a leaf spring) can be used for biasing the shutter 2 in the direction in which the shutter 2 closes the openings 5a and 6a.

Figure 8A:
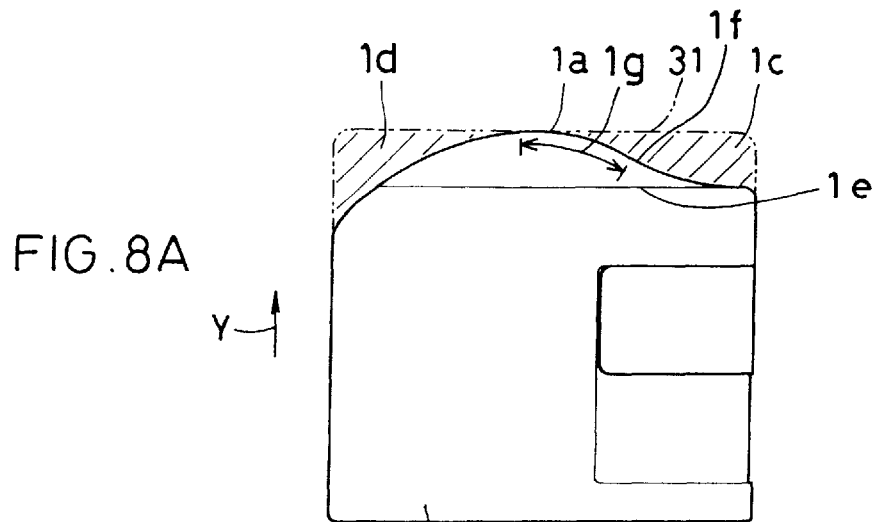
FIGS. 8A, 8B, and 8C are plan views respectively showing planar shapes of different examples of a disk cartridge according to the present invention in comparison with a conventional disk cartridge.
Figure 8B:
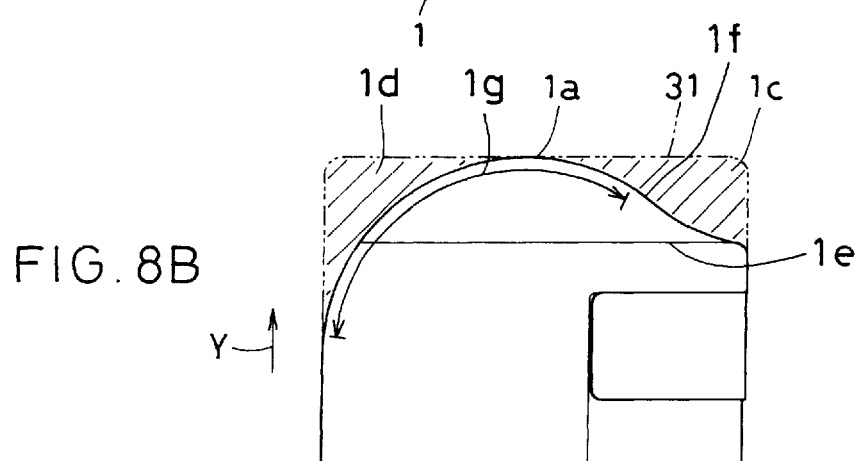
Figure 8C:
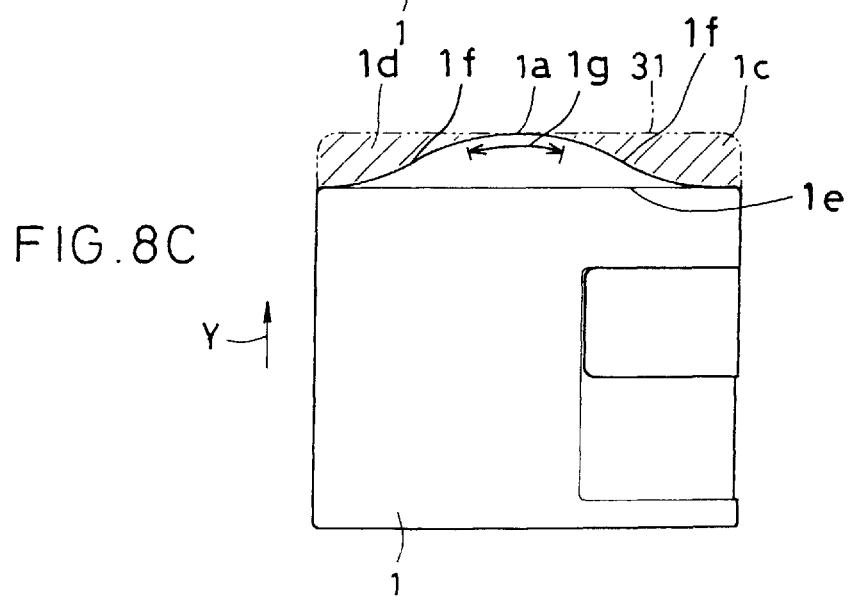
Figure 9A:
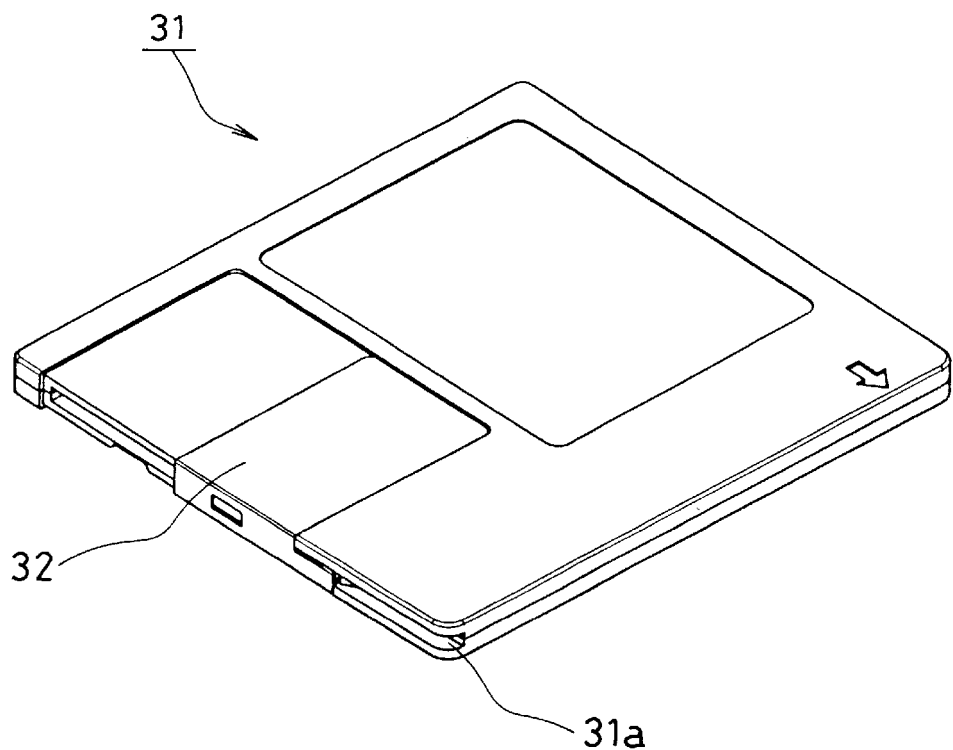
FIGS. 9A and 9B are perspective views showing the appearance of a conventional disk cartridge.
Figure 9B:
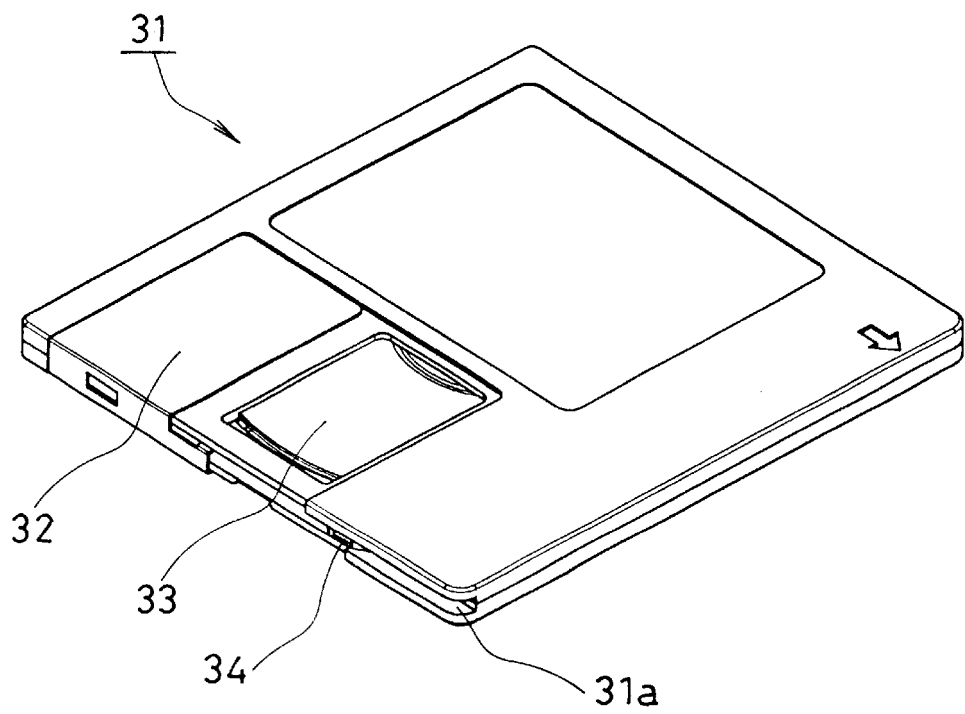
Figure 10:
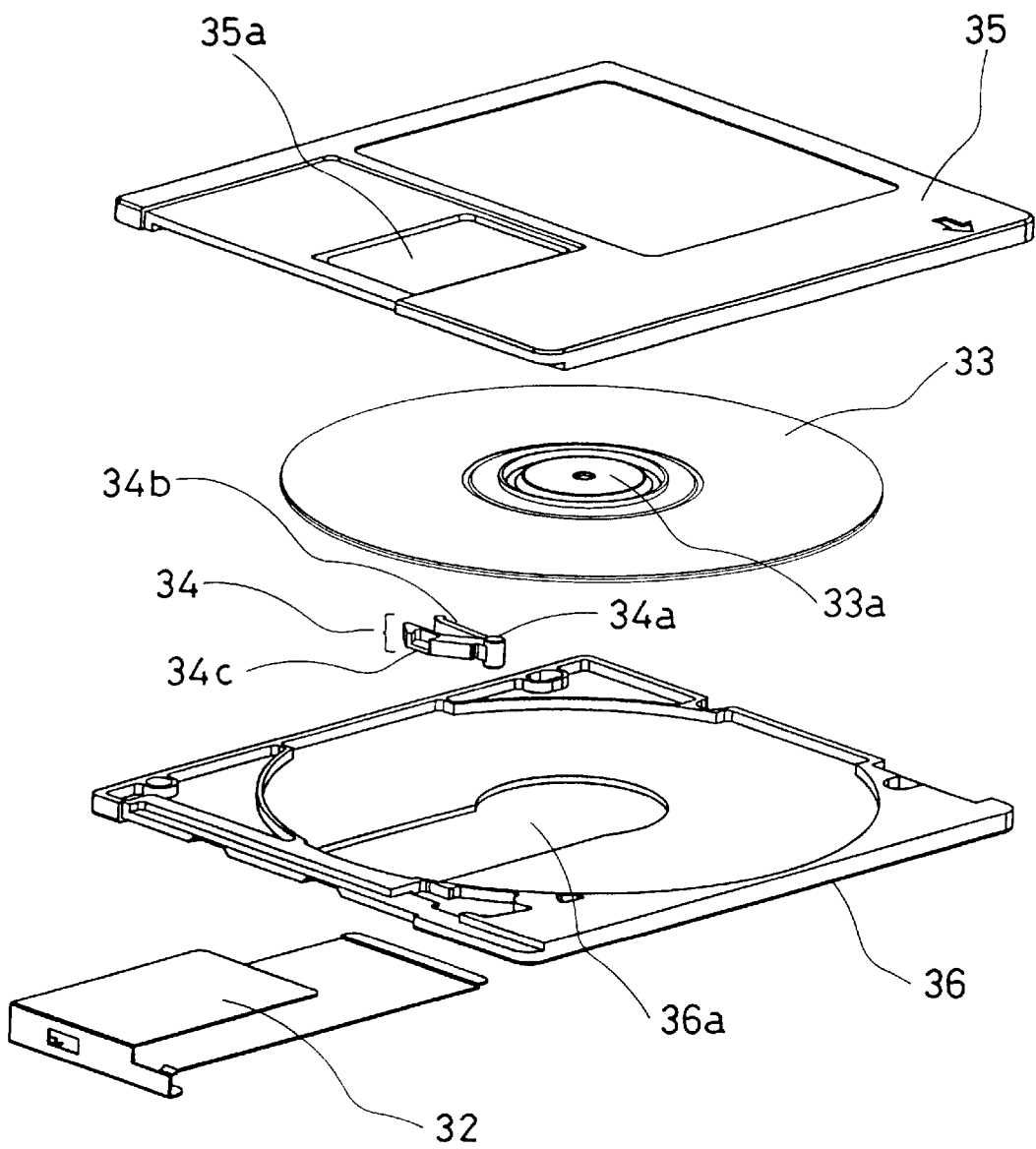
FIG. 10 is an exploded perspective view showing the structure of a conventional disk cartridge.

It also could be noted that the shape of the disk cartridge is not limited to that in the above-mentioned embodiment. The disk cartridge may have a shape as shown in FIGS. 8A, 8B, and 8C. In each of FIGS. 8A, 8B, and 8C, reference numeral 1a denotes a round portion formed on the forefront edge 1e in the insertion direction indicated by the arrow Y and reference numeral 31 denotes a conventional disk cartridge having a substantially square shape.

In a disk cartridge shown in FIG. 8A, an inflection point 1f is on the outer periphery on the side of the shutter sliding edge with respect to the leading end at the center of the round portion 1a. Accordingly, a shape of the forefront of the disk cartridge in the insertion direction indicated by the arrow Y is defined by a convex curve with respect to the insertion direction indicated by the arrow Y at the central portion of the round portion 1a and a concave curve with respect to the insertion direction indicated by the arrow Y along the forefront edge 1e in the insertion direction, which are gently combined with each other via the inflection point 1f. This structure provides a notch portion 1c maintaining a required size and sliding distance of the shutter and secures a space for mounting a mechanism for maintaining the closing state of the shutter (the shutter lock 4 shown in FIG. 2, for example). On the other hand, on the side of the edge opposite to the shutter sliding edge with respect to the leading end at the center of the round portion 1a, a convex curve with respect to the insertion direction indicated by the arrow Y is provided without an inflection point. A notch portion 1d larger than the notch portion 1c thus can be obtained. Further, reference numeral 1g denotes a circular arc portion whose center substantially coincides with the center of rotation of the disk to be accommodated. A radius of the circular arc portion 1g can be set to be as small as possible as long as it provides sufficient space for rotating the accommodated disk. This disk cartridge enables more components of the drive unit to be arranged in an open space produced by the enlarged notch portion 1d, whereby a thickness of the drive unit can be decreased further.

A disk cartridge shown in FIG. 8B differs from the disk cartridge shown in FIG. 8A in the following two points. First, a notch portion 1c at the shutter side is enlarged by forming the forefront edge 1e in the insertion direction as close as possible to the shutter side while maintaining the size of openings, a sliding distance of the shutter, and a space for mounting a mechanism for maintaining the closing state of the shutter. Second, a notch portion 1d on the side opposite to the shutter is enlarged by forming the outer periphery of the round portion 1a (on the side of the edge opposite to the shutter sliding edge with respect to the leading end at the center of the round portion 1a) in a circular arc shape whose center substantially coincides with the center of rotation of the disk to be accommodated and then gently connecting the outer periphery thereof and the edge opposite to the shutter sliding edge with each other. As a result, the range of the circular arc portion 1g whose center substantially coincides with the center of rotation of the disk to be accommodated is made larger than that shown in FIG. 8A. A radius of the circular arc portion 1g can be set to be as small as possible as long as it provides sufficient space for rotating the accommodated disk. This disk cartridge provides the notch portions 1c and 1d larger than that of the disk cartridge shown in FIG. 8A and a thickness of the drive unit thus can be decreased further.

In a disk cartridge shown in FIG. 8C, inflection points 1f are provided on both sides of the round portion 1a. Accordingly, a convex curve with respect to the insertion direction indicated by the arrow Y at the central portion of the round portion 1a and concave curves with respect to the insertion direction indicated by the arrow Y along the forefront edge 1e in the insertion direction on both sides of the central portion are gently combined with each other via the inflection points 1f. As a result, the outer peripheral shape of the forefront in the insertion direction is substantially symmetrical with respect to the medial axis that is parallel to the insertion direction indicated by the arrow Y. As in the above-mentioned cases, reference numeral 1g denotes a circular arc portion whose center substantially coincides with the center of rotation of the disk to be accommodated. A position of the edge 1e is determined by taking a size of the opening, a sliding distance of the shutter, and a space for mounting a mechanism for maintaining the closing state of the shutter into consideration.

As in the disk cartridge shown in FIGS. 8A and 8B, when the outer peripheral shape of the forefront in the insertion direction is asymmetrical with respect to the medial axis that is parallel to the insertion direction indicated by the arrow Y, an erroneous-insertion-preventing function for preventing the insertion when the disk cartridge is inserted upside down can be provided with the use of the above-mentioned asymmetrical shape.

It is to be noted that, although the substantially rectangular portion is clearly distinguished from the round portion 1a by their appearances through the edge 1e in the above-mentioned disk cartridges, a disk cartridge according to the present invention is not limited to this structure. That is to say, the substantially rectangular portion and the round portion 1a may be formed as a continuous smooth surface.

It is to be noted that, although the above-described embodiments are drawn to a drive unit for a magneto-optical disk, the present invention can be applied to a drive unit for an optical disk, and can produce substantially the same effect.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A disk cartridge comprising:

a case for rotatably accommodating a disk for recording and/or reproducing information;

an opening, which is provided in the case, for exposing part of the disk; and a shutter for closing the opening, wherein a planar shape of the case includes a substantially rectangular portion and a protruding round portion formed on a forefront edge in a direction of insertion into a drive unit, at least part of an outer periphery of the round portion being formed in a circular arc shape whose center substantially coincides with a center of rotation of the disk to be accommodated, the shutter slides along with one edge that is parallel to the direction of insertion into a drive unit, and the outer periphery of the round portion has an inflection point on a side of a shutter sliding edge and has no inflection point on a side of an edge opposite to the shutter sliding edge with respect to the leading end of the round portion.

2. The disk cartridge according to claim 1, wherein a leading end of the round portion in the direction of insertion into a drive unit is thinner than the substantially rectangular portion.

3. The disk cartridge according to claim 1, wherein the round portion is formed so as to be gradually decreased in thickness toward the leading end.

4. The disk cartridge according to claim 1 further comprising:

a closing-state maintaining mechanism for maintaining a state where the opening is closed by the shutter.

5. The disk cartridge according to claim 1, wherein a magneto-optical disk or an optical disk is accommodated.

6. A disk cartridge comprising:

a case for rotatably accommodating a disk for recording and/or reproducing information;

an opening, which is provided in the case, for exposing part of the disk; and a shutter for closing the opening, wherein a planar shape of the case includes a substantially rectangular portion and a protruding round portion formed on a forefront edge in a direction of insertion into a drive unit, a leading end of the round portion in the direction of insertion into a drive unit is thinner than the substantially rectangular portion, and the shutter slides along with one edge that is parallel to the direction of insertion into a drive unit.

7. The disk cartridge according to claim 6, wherein the round portion is formed so as to be gradually decreased in thickness toward the leading end.

8. The disk cartridge according to claim 6, wherein the outer periphery of the round portion has an inflection point on a side of a shutter sliding edge and has no inflection point on a side of an edge opposite to the shutter sliding edge with respect to the leading end of the round portion.

9. The disk cartridge according to claim 6 further comprising:

a closing-state maintaining mechanism for maintaining a state where the opening is closed by the shutter.

10. The disk cartridge according to claim 6, wherein a magneto-optical disk or an optical disk is accommodated.

* * * * *